United States Patent
He et al.

(10) Patent No.: US 8,545,911 B2
(45) Date of Patent: Oct. 1, 2013

(54) METHOD FOR REMOVING PHORBOL ESTER IN ORGANIC SUBSTANCE, METHOD FOR PRODUCING HIGH-PROTEIN ORGANIC SUBSTANCE, HIGH-PROTEIN ORGANIC SUBSTANCE, METHOD FOR PRODUCING FEED AND FEED

(75) Inventors: Yuxi He, Shinjuku-ku (JP); Hideo Kikutsugi, Chiyoda-ku (JP)

(73) Assignees: Idemitsu Kosan Co., Ltd., Tokyo (JP); Nippon Biodiesel Fuel Co., Ltd., Tokyo (JP)

( * ) Notice: Subject to any disclaimer, the term of this patent is extended or adjusted under 35 U.S.C. 154(b) by 66 days.

(21) Appl. No.: 13/148,749

(22) PCT Filed: Feb. 9, 2010

(86) PCT No.: PCT/JP2010/000770
§ 371 (c)(1),
(2), (4) Date: Sep. 27, 2011

(87) PCT Pub. No.: WO2010/092792
PCT Pub. Date: Aug. 19, 2010

(65) Prior Publication Data
US 2012/0009301 A1  Jan. 12, 2012

(30) Foreign Application Priority Data
Feb. 13, 2009 (JP) ................. 2009-054157

(51) Int. Cl.
*A23J 1/14* (2006.01)
(52) U.S. Cl.
USPC .................. 426/46; 426/7; 426/656; 435/272
(58) Field of Classification Search
USPC ................. 426/46, 7, 656; 435/272
See application file for complete search history.

(56) References Cited

U.S. PATENT DOCUMENTS

| 7,678,930 | B2 | 3/2010 | Sondbo et al. |
| 7,718,698 | B2 | 5/2010 | Breivik et al. |
| 7,732,488 | B2 | 6/2010 | Breivik et al. |
| 2010/0104657 | A1 | 4/2010 | Sondbo et al. |
| 2010/0233281 | A1 | 9/2010 | Breivik et al. |
| 2010/0267829 | A1 | 10/2010 | Breivik et al. |

FOREIGN PATENT DOCUMENTS

| JP | 5-268881 | 10/1993 |
| JP | 8-214822 | 8/1996 |
| JP | 3905538 B2 | 1/2007 |

OTHER PUBLICATIONS

CN-101-225-416. Publication date Jul. 23, 2008. English Abstract.*
Extended European Search Report issued Dec. 3, 2012 in Patent Application No. 10741072.2.
Harinder Makkar et al., "Removal and Degradation of Phorbol Esters During Pre-treatment and Transesterification of *Jatropha curcas* Oil", Journal of the American Oil Chemists' Society, vol. 86, No. 2, XP-002526665, Dec. 10, 2008, pp. 173-181.
E. M. Aregheore et al., "Detoxification of a Toxic Variety of *Jatropha curcas* Using Heat and Chemical Treatments, and Preliminary Nutritional Evaluation With Rats", South Pacific Journal of Natural Science, vol. 21, XP-002526667, Jan. 1, 2003, pp. 50-56.
Harinder PS Makkar et al., "Protein Concentrate from *Jatropha curcas* Screw-Pressed Seed Cake and Toxic and Antinutritional Factors in Protein Concentrate", Journal of the Science of Food and Agriculture, vol. 88, No. 9, XP-0022577995, Jul. 1, 2008, pp. 1542-1548.
International Search Report issued May 11, 2010 in PCT/JP2010/000770.
International Preliminary Report on Patentability issued Sep. 13, 2011 in PCT/JP2010/000770.
K.D. Rakshit, et al., "Toxicity Studies of Detoxified *Jatropha* Meal (*Jatropha curcas*) in Rats", Food and Chemical Toxicology, vol. 46, No. 12, abstract, 2008:1420639, CAPLUS, 2008, pp. 3621-3625.

* cited by examiner

*Primary Examiner* — D. Lawrence Tarazano
*Assistant Examiner* — Hamid R Badr
(74) *Attorney, Agent, or Firm* — Oblon, Spivak, McClelland, Maier & Neustadt, L.L.P.

(57) ABSTRACT

A phorbol ester is decomposed by mixing an organic substance containing a phorbol ester and *Bacillus substilis* var. *natto* and subjecting the resulting mixture to fermentation. At this time, 4 parts by mass of organic substance containing a phorbol ester is mixed with 0.5 to 3 parts by mass of water, and the resulting mixture is subjected to high-temperature and high-pressure sterilization. Then, a solution obtained by dissolving 0.004 to 0.2 part by mass of *Bacillus subtilis* var. *natto* in 0.5 to 1 part by mass of water is added, and the resulting mixture is subjected to fermentation at 30 to 50° C. for two to four weeks.

21 Claims, 18 Drawing Sheets

Phorbol ester detection peak of an organic substance before a fermentation treatment with *Bacillus subtilis var. natto*
(HPLC measurement results)

Phorbol ester detection peak of an organic substance after a fermentation treatment with *Bacillus subtilis* var

FIG. 5

```
┌─────────────────────────┐
│ An organic substance    │
│ containing a phorbol    │      ┌──────────────────────┐
│ ester component         │      │ Water  Weight A/2kg  │
│ Weight A kg             │      └──────────────────────┘
└─────────────────────────┘
            │                              │
            ▼                              │
┌─────────────────────────┐◄───────────────┘
│     Mixing process      │
└─────────────────────────┘
            │                      ┌─────────────────────────────┐
            ▼                      │ A solution obtained by       │
┌─────────────────────────┐        │ dissolving 0.01 × A kg       │
│ High-temperature and    │        │ (weight) of Bacillus subtilis│
│ high-pressure sterilizing│       │ var. natto in A kg (weight) of│
│ process (autoclave)     │        │ sterilized water             │
└─────────────────────────┘        └─────────────────────────────┘
            │                              │
            ▼                              │
┌─────────────────────────┐◄───────────────┘
│    Stirring process     │
└─────────────────────────┘
            │
            ▼
┌─────────────────────────────────┐
│ Fermentation process            │
│ At a temperature of 37 to 50°C  │
│ for 2 to 4 weeks in a sealed    │
│ condition                       │
└─────────────────────────────────┘
            │
            ▼
┌─────────────────────────────────┐
│ An organic substance of which   │
│ the phorbol ester component has │
│ been decomposed                 │
└─────────────────────────────────┘
```

FIG. 11

```
┌─────────────────────────┐        ┌─────────────────────────┐
│   An organic substance  │        │ Bacillus subtilis var.  │
│ containing a phorbol    │        │         natto           │
│   ester component       │        │                         │
└───────────┬─────────────┘        └────────────┬────────────┘
            │                                   │
            ▼                                   ▼
         ┌──────────────────────────────────────┐
         │           Stirring process           │
         └──────────────────┬───────────────────┘
                            ▼
         ┌──────────────────────────────────────┐
         │         Fermentation process         │
         └──────────────────┬───────────────────┘
                            ▼
   ┌────────────────────────────────────────────────┐
   │ High-protein organic substance of which the    │
   │ phorbol ester component has been decomposed    │
   └────────────────────────────────────────────────┘
```

FIG. 12

```
┌─────────────────────────┐      ┌─────────────────────────┐
│   An organic substance  │      │                         │
│  containing a phorbol   │      │ Water 0.5 to 3 parts by │
│ ester component 4 parts │      │          mass           │
│         by mass         │      │                         │
└───────────┬─────────────┘      └────────────┬────────────┘
            │                                 │
            ▼                                 │
┌─────────────────────────┐                   │
│     Mixing process      │◄──────────────────┘
└───────────┬─────────────┘      ┌─────────────────────────┐
            │                    │   A solution obtained   │
            ▼                    │   by dissolving 0.004   │
┌─────────────────────────┐      │  to 0.2 part by mass of │
│  High-temperature and   │      │   Bacillus subtilis     │
│ high-pressure steriliz- │      │   var. natto in 0.5     │
│  ation process (auto-   │      │  to 1 part by mass of   │
│         clave)          │      │     sterilized water    │
└───────────┬─────────────┘      └────────────┬────────────┘
            │                                 │
            ▼                                 │
┌─────────────────────────┐                   │
│     Stirring process    │◄──────────────────┘
└───────────┬─────────────┘
            ▼
┌─────────────────────────┐
│   Fermentation process  │
│ At a temperature of 30  │
│  to 50°C for 2 to 4     │
│ weeks in a sealed       │
│       condition         │
└───────────┬─────────────┘
            ▼
┌─────────────────────────┐
│ A high-protein organic  │
│  substance of which the │
│   phorbol ester com-    │
│ ponent has been decomp- │
│          osed           │
└─────────────────────────┘
```

FIG. 14

```
┌─────────────────────────┐      ┌─────────────────────────┐
│ An organic substance    │      │ Water 0.5 to 1.5 part   │
│ containing a phorbol    │      │ by mass                 │
│ ester component 2 parts │      └─────────────────────────┘
│ by mass                 │                 │
└─────────────────────────┘                 │
            │                               │
            ▼                               ▼
       ┌──────────────────────┐
       │ First mixing process │
       └──────────────────────┘
                  │
                  ▼
       ┌──────────────────────────┐     ┌──────────────────────────────────┐
       │ First high-temperature   │     │ A solution obtained by adding    │
       │ and high-pressure        │     │ 0.002 to 0.1 part by mass of     │
       │ sterilizing process      │     │ Bacillus subtilis var. natto to  │
       │ (autoclave)              │     │ 0.5 part by mass of sterilized   │
       └──────────────────────────┘     │ water                            │
                  │                     └──────────────────────────────────┘
                  ▼                               │
       ┌──────────────────────┐                   │
       │ First stirring       │◀──────────────────┘
       │ process              │
       └──────────────────────┘
                  │
                  ▼
       ┌──────────────────────────┐         ┌──────────────────────┐
       │ Pre-culture process      │────────▶│ Pre-culture product  │
       │ At a temperature of 30   │         └──────────────────────┘
       │ to 50°C for 1 to 7 days  │
       │ in a sealed condition    │
       └──────────────────────────┘

┌─────────────────────────┐      ┌─────────────────────────┐
│ An organic substance    │      │ Water 2 to 4 parts by   │
│ containing a phorbol    │      │ mass                    │
│ ester component 5 parts │      └─────────────────────────┘
│ by mass                 │                 │
└─────────────────────────┘                 │
            │                               │
            ▼                               ▼
       ┌──────────────────────┐
       │ Second mixing        │
       │ process              │
       └──────────────────────┘
                  │
                  ▼
       ┌──────────────────────────┐     ┌──────────────────────────────────┐
       │ Second high-temperature  │     │ A solution obtained by adding 1  │
       │ and high-pressure        │     │ to 4 parts by mass of part of    │
       │ sterilization process    │     │ the pre-cultured product to 1    │
       │ (autoclave)              │     │ part by mass of sterilized water │
       └──────────────────────────┘     └──────────────────────────────────┘
                  │                               │
                  ▼                               │
       ┌──────────────────────┐                   │
       │ Second stirring      │◀──────────────────┘
       │ process              │
       └──────────────────────┘
                  │
                  ▼
       ┌──────────────────────────┐
       │ Primary fermentation     │
       │ process                  │
       │ At a temperature of 30   │
       │ to 50°C for 2 to 4 weeks │
       │ in a sealed condition    │
       └──────────────────────────┘
                  │
                  ▼
       ┌──────────────────────────┐
       │ A high-protein organic   │
       │ substance of which the   │
       │ phorbol ester component  │
       │ has been decomposed      │
       └──────────────────────────┘
```

FIG. 15

| Heavy metals analyzed | Results | Minimum limit of determination | Method |
|---|---|---|---|
| Arsenic (as As$_2$O$_3$) | Not detected | 0.1 ppm | Atomic absorption method |
| Lead | 0.12 ppm | — | Atomic absorption method |
| Cadmium | Not detected | 0.01 ppm | Atomic absorption method |
| Total mercury | Not detected | 0.01 ppm | Reduction vaporizing atomic absorption method |

FIG. 16

| <Weight> | Test section | Individual | Body weight (g) | | | |
|---|---|---|---|---|---|---|
| | | | 0 day after | 7 days after | 14 days after | 21 days after |
| Example 1<br>Fermented *Jatropha curcas. (L.)* | 1 | 1-1 | 67.2 | 145.5 | 372.4 | 542.8 |
| | | 1-2 | 99.0 | 229.5 | 457.2 | 722.7 |
| | | 1-3 | 102.3 | 221.6 | 422.0 | 626.2 |
| | | 1-4 | 111.9 | 295.1 | 636.4 | 1035.1 |
| | | 1-5 | 115.6 | 254.6 | 531.8 | 847.8 |
| | | 1-6 | 121.8 | 256.7 | 512.7 | 608.5 |
| | | 1-7 | 125.0 | 244.2 | 498.8 | 805.7 |
| | | Mean value ± SD | 106.1±19.6 | 235.3±46.1 | 490.2±85.0 | 741.3±169.5 |
| Comparative Example 1<br>*Jatropha curcas. (L.)* | 2 | 2-1 | 77.3 | 193.3 | * | * |
| | | 2-2 | 97.3 | 173.5 | 144.9 | * |
| | | 2-3 | 103.0 | 187.4 | * | * |
| | | 2-4 | 109.9 | 168.6 | * | * |
| | | 2-5 | 114.3 | 201.0 | 217.7 | * |
| | | 2-6 | 121.7 | 192.3 | * | * |
| | | 2-7 | 124.0 | 171.5 | * | * |
| | | Mean value ± SD | 106.8±16.1 | 183.9±12.6 | 181.3±51.5 | - |
| Comparative Example 2<br>Defatted soybean oil | 3 | 3-1 | 80.2 | 193.3 | 451.9 | 770.8 |
| | | 3-2 | 97.2 | 213.1 | 517.0 | 827.9 |
| | | 3-3 | 103.3 | 205.9 | 475.1 | 777.9 |
| | | 3-4 | 107.4 | 275.2 | 627.1 | 1017.6 |
| | | 3-5 | 112.6 | 213.7 | 461.2 | 786.7 |
| | | 3-6 | 120.1 | 247.8 | 467.2 | 743.7 |
| | | 3-7 | 123.2 | 245.2 | 505.7 | 825.2 |
| | | Mean value ± SD | 106.3±14.7 | 227.7±29.0 | 500.7±60.5 | 822.1±90.8 |
| Control section<br>Nothing added | 4 | 4-1 | 83.6 | 198.7 | 449.8 | 712.6 |
| | | 4-2 | 87.8 | 217.5 | 464.2 | 696.2 |
| | | 4-3 | 103.6 | 247.7 | 501.1 | 775.5 |
| | | 4-4 | 106.0 | 226.6 | 460.2 | 684.3 |
| | | 4-5 | 116.6 | 263.3 | 552.3 | 833.0 |
| | | 4-6 | 118.4 | 289.3 | 553.4 | 804.7 |
| | | 4-7 | 129.2 | 302.8 | 583.5 | 837.8 |
| | | Mean value ± SD | 106.5±16.5 | 249.4±38.2 | 509.2±53.8 | 763.4±65.3 |

SD: standard deviation
*: Died during the test

FIG. 17

<Weight gain>

| Test section | | Individual | Weight gain (g) | | | |
|---|---|---|---|---|---|---|
| | | | 0 to 7 days after | 7 to 14 days after | 14 to 21 days after | 0 to 21 days after |
| Example 1 | 1 | 1-1 | 78.3 | 226.9 | 170.4 | 475.6 |
| | | 1-2 | 130.5 | 227.7 | 265.5 | 623.7 |
| | | 1-3 | 119.3 | 200.4 | 204.2 | 523.9 |
| | | 1-4 | 183.2 | 341.3 | 398.7 | 923.2 |
| | | 1-5 | 139.0 | 277.2 | 316.0 | 732.2 |
| Fermented *Jatropha curcas.* (L.) | | 1-6 | 134.9 | 256.0 | 95.8 | 486.7 |
| | | 1-7 | 119.2 | 254.6 | 306.9 | 680.7 |
| | | Mean value ± SD | 129.2±31.2 | 254.9±45.6 | 251.1±101.8 | 635.1±160.5 |
| Comparative Example 1 | 2 | 2-1 | 116.0 | - | - | 116.0 |
| | | 2-2 | 76.2 | -28.6 | - | 47.6 |
| | | 2-3 | 84.4 | - | - | 84.4 |
| | | 2-4 | 58.7 | - | - | 58.7 |
| *Jatropha curcas.* (L.) | | 2-5 | 86.7 | 16.7 | - | 103.4 |
| | | 2-6 | 70.6 | - | - | 70.6 |
| | | 2-7 | 47.5 | - | - | 47.5 |
| | | Mean value ± SD | 77.2±22.0 | -6.0±32.0 | - | 75.5±27.0 |
| Comparative Example 2 | 3 | 3-1 | 113.1 | 258.6 | 318.9 | 690.6 |
| | | 3-2 | 115.9 | 303.9 | 310.9 | 730.7 |
| | | 3-3 | 102.6 | 269.2 | 302.8 | 674.6 |
| | | 3-4 | 167.8 | 351.9 | 390.5 | 910.2 |
| Defatted soybean oil | | 3-5 | 101.1 | 247.5 | 325.5 | 674.1 |
| | | 3-6 | 127.7 | 219.4 | 281.5 | 628.6 |
| | | 3-7 | 122.0 | 260.5 | 319.5 | 702.0 |
| | | Mean value ± SD | 121.5±22.6 | 273.0±43.0 | 321.4±33.8 | 715.8±91.2 |
| Control section | 4 | 4-1 | 115.1 | 251.1 | 262.8 | 629.0 |
| | | 4-2 | 129.7 | 246.7 | 232.0 | 608.4 |
| | | 4-3 | 144.1 | 253.4 | 274.4 | 671.9 |
| | | 4-4 | 120.6 | 233.6 | 224.1 | 578.3 |
| Nothing added | | 4-5 | 146.7 | 289.0 | 280.7 | 716.4 |
| | | 4-6 | 170.9 | 264.1 | 251.3 | 686.3 |
| | | 4-7 | 173.6 | 280.7 | 254.3 | 708.6 |
| | | Mean value ± SD | 143.0±23.0 | 259.8±19.5 | 254.2±20.8 | 657.0±52.6 |

FIG. 18

<Feed intake>

| | | Feed intake (g) | | | |
|---|---|---|---|---|---|
| | | 0 to 7 days after | 8 to 14 days after | 15 to 21 days after | 0 to 21 days after (cumulative) |
| Example 1 | Fermented *Jatropha curcas (L.)* | 1400 | 2300 | 3400 | 7100 |
| Comparative Example 1 | *Jatropha curcas (L.)* | 1200 | 300 | 0 | 1500 |
| Comparative Example 2 | Defatted soybean oil | 1550 | 2450 | 4700 | 8700 |
| Control section | Nothing added | 2000 | 2600 | 4000 | 8600 |

FIG. 19

<Results of breeding>

| | Weight gain (g) | Feed intake (g) | Health condition | Weight gain per feed intake × 100 |
|---|---|---|---|---|
| Example 1 | Fermented *Jatropha curcas (L.)* | 635 | 7100 | Good | 8.9 |
| Comparative Example 1 | *Jatropha curcas (L.)* | 76 | 1500 | All mice died | - |
| Comparative Example 2 | Defatted soybean oil | 716 | 8700 | Good | 8.2 |
| Control section | Nothing added | 657 | 8600 | Good | 7.6 |

METHOD FOR REMOVING PHORBOL ESTER IN ORGANIC SUBSTANCE, METHOD FOR PRODUCING HIGH-PROTEIN ORGANIC SUBSTANCE, HIGH-PROTEIN ORGANIC SUBSTANCE, METHOD FOR PRODUCING FEED AND FEED

This application is a National Stage of PCT/JP10/000,770 filed Feb. 9, 2010 and claims the benefit of JP 2009-054157 filed Feb. 13, 2009.

TECHNICAL FIELD

The invention relates to a method for removing a phorbol ester component by mixing an organic substance containing a phorbol ester component with a microorganism, and by subjecting the resulting mixture to fermentation, whereby the microorganism is allowed to decompose the phorbol ester component in the organic substance.

BACKGROUND ART

As the treatment method which is conducted aiming at removing an environmental pollutant or a toxic substance contained in a feed or a feed raw material in the processing and production processes of a feed for animals or a raw material thereof, methods disclosed in Patent Documents 1 and 2 can be given as representative examples.

Patent Document 1 discloses a technology in which an aliphatic acid ester, an aliphatic acid amide, free aliphatic acid or a hydrocarbon, which are volatile operation fluids, is added to a fat or oil which contains an environmental pollutant or a toxic component, and the fat or the oil and the volatile operation fluid are together subjected to a stripping treatment, whereby an environment pollutant or a toxic component is separated from the fat or the oil. Here, the stripping treatment means a treatment for removing a specific substance which is desired to be removed from a fluid by the following methods. A vapor or a gas is blown to a fluid which contains a specific substance to be removed; a highly-volatile fluid mixed, followed by evaporation of the fluid; a fluid which contains a specific substance to be removed is entirely brought into a vacuum state, whereby the specific substance is allowed to move to a vapor phase, a gas phase or a volatile fluid phase; or a specific substance itself is evaporated.

The technology disclosed in Patent Document 2 is aiming at removing phytic acid contained in cereal served as a feed or a food. If an animal intakes a feed or a food which contains phytic acid in a high concentration, normal intestinal absorption of trace metals which are nutritionally important is inhibited, causing a series of deficiencies. Therefore, it is required that the phytic acid be removed from a cereal which contains thereof. In this conventional technology, a cereal containing phytic acid such as soybean oil cakes is inoculated with *Aspergillus oryzae* to produce Koji, and a phytic acid-decomposing enzyme such as phytase or phosphatase which is produced during the proliferation process of the *Aspergillus oryzae* is utilized to remove by decomposition of the phytic acid in the cereal.

Patent Document 1: JP-B-3905538
Patent Document 2: JP-A-H08-214822

SUMMARY OF THE INVENTION

Problems to be Solved by the Invention

However, in the conventional technology disclosed in the Patent Document 1, after the stripping process, a volatile operation fluid containing an environmental pollutant or a toxic component remains. It is not easy to separate an environmental pollutant or a toxic component from this volatile operation fluid. Therefore, it is difficult to reuse a volatile operation fluid which has once been subjected to a stripping process. Accordingly, it is required to use a new volatile operation fluid for each stripping process. It is also required to treat safely an environmental pollutant or a toxic component contained in a volatile operation fluid which has been subjected to a stripping process, which causes the running cost associated with the treatment to increase.

The stripping treatment used in this technology has a problem that, in a stripping chamber where stripping is actually conducted, unless the temperature or pressure of the chamber, the supply speed of a volatile operation fluid or the like are accurately controlled, the removal ratio of an environment pollutant or a toxic component is not improved. Therefore, in order to realize the accurate control and the improvement of the removal ratio, it is inevitably required to set up an expensive device or apparatus for control, which results in an increase in the initial cost incurred at the time of introducing equipment.

In addition, in the stripping treatment used in this conventional technology, the removal ratio cannot be improved unless an environmental pollutant or a toxic component contained in a substance to be treated is sufficiently mixed or brought into contact with a volatile operation fluid in a stripping chamber. Therefore, this conventional stripping treatment has a problem that a substance to be treated is inevitably limited to a liquid substance such as fat or oil. That is, this conventional treatment has a serious problem that it is difficult to be applied to a solid substance to be treated such as soybean oil cakes or oil cakes of other plants.

The conventional technology disclosed in Patent Document 2 can be applied to a solid substance to be treated such as soy bean oil cakes and oil cakes of other plants. However, by this technology, only phytic acid contained in a substance to be treated can be removed. Therefore, this technology has a drawback that it cannot be applied to other toxic components contained in a substance which cannot be decomposed with a phytic acid-decomposing enzyme such as phytase and phosphotase which is produced during the proliferation of *Aspergillus oryzae*.

A seed of *Jatropha curcas* (L.) of Euphorbiaceae has an oil component in such a large amount of 30 to 40%. Since this oil contains a carcinogenic phorbol ester, it is not suited for use as a food. Therefore, in recent years, all over the world, this oil has attracted attention as a promising regenerative energy resource which does not cause competition with the use as a food. When a large amount of the seeds are subjected to oil pressing, a large amount of oil cakes are inevitably generated. Oil cakes of *Jatropha curcas* (L.) *Jatropha curcas* (L.) have a high protein content, i.e. about 60%, as compared with soybean oil cakes (about 45%), which are a primary raw material of a feed. Therefore, oil cakes of *Jatropha curcas* (L.) *Jatropha curcas* (L.) has a potential that they can be used as a raw material of a feed which is superior to soybean oil cakes. However, oil cakes of *Jatropha curcas* (L.) *Jatropha curcas* (L.) also contain a phorbol ester, and hence, it cannot be used actually as a raw material of a feed. Under the current circumstances, seeds of *Jatropha curcas* (L.) *Jatropha curcas* (L.) can be used only as a fertilizer which has a low additional value or, otherwise, are disposed without use.

Even though an attempt is made to apply the conventional technology disclosed in Patent Document 1 to remove a phorbol ester component, which is toxic, from an organic substance containing a carcinogenic phorbol ester component such as oil cakes of *Jatropha curcas* (L.) *Jatropha curcas* (L.) seeds, it is physically difficult to sufficiently remove a phorbol ester component by the stripping treatment used in this technology since oil cakes of *Jatropha curcas* (L.) *Jatropha curcas* (L.) seeds are organic substances in the form of a solid. Further, even when the conventional technology disclosed in Patent Document 2 is applied, a phorbol ester component cannot be removed sufficiently since *Aspergillus oryzae* has a poor decomposition capability for a phorbol ester component.

As mentioned hereinabove, the object of removing, sufficiently at a low cost, a phorbol ester component which is a toxic component, from an organic substance containing a carcinogenic phorbol ester component such as oil cakes of *Jatropha curcas* (L.) *Jatropha curcas* (L.) seeds cannot be attained only by conventional technologies which have already been disclosed. Under such circumstances, development of a new technology which is capable of attaining the above-mentioned object has been demanded.

The object of the invention is to provide a method for decomposing and removing a phorbol ester component at a low cost and with a high degree of treatment capability from an organic substance containing a phorbol ester component by utilizing a microorganism which exhibits a high degree of decomposition capability for carcinogenic phorbol ester components and can be easily available, as well as to provide a high-protein organic substance which can be suitably used as a feed for a domestic animal, a method for producing a high-protein organic substance, a feed and a method for producing a feed.

Means for Solving the Problems

In order to attain the above-mentioned object, the invention according to claim 1 is characterized by mixing an organic substance containing a phorbol ester component and *Bacillus substilis* var. *natto* and subjecting the resulting mixture to fermentation, thereby to allow the phorbol ester component to be decomposed by a microorganism.

The invention according to claim 2 is characterized by, in the above-mentioned invention, when the weight of the organic substance containing a phorbol ester component is taken as A kg, mixing the organic substance containing a phorbol ester component with A/2 kg of water, subjecting the resulting mixture to high-temperature and high-pressure sterilization, adding with stirring a solution obtained by dissolving 1 wt % of *Bacillus substilis* var. *natto* in A kg of sterilized water to the mixture which has been subjected to the high-temperature and high-pressure sterilization, followed by sufficient mixing, and subjecting the resulting mixture to fermentation at 37 to 50° C. for 2 to 4 weeks.

The invention according to claim 3 is characterized by, in the above-mentioned invention of claim 1, when the weight of the organic substance containing a phorbol ester component is taken as A kg, mixing the organic substance containing a phorbol ester component with A/2 kg of water, subjecting the resulting mixture to high-temperature and high-pressure sterilization, adding with stirring a solution obtained by dissolving in A kg of sterilized water 5 wt % of an organic mixture which has been treated in advance by the method for removing a phorbol ester according to claim 1 or 2 to the mixture which has been subjected to the high-temperature and high-pressure sterilization, followed by sufficient mixing, and subjecting the resulting mixture to fermentation at 37 to 50° C. for two to four weeks.

The invention according to claim 4 is characterized in that, in the above-mentioned invention, oil cakes obtained by subjecting seeds of *Jatropha curcas* (L.) *Jatropha curcas* (L.) of Euphorbiaceae to oil pressing are used as the organic substance containing a phorbol ester component.

The invention according to claim 5 is characterized in that, in the above-mentioned invention, oil cakes obtained by a process in which seeds of *Jatropha curcas* (L.) *Jatropha curcas* (L.) of Euphorbiaceae are threshed to take the kernels thereof out, and the kernels are then subjected to oil pressing are used as the organic substance containing a phorbol ester component.

The method for producing a high-protein organic substance according to the invention is characterized by mixing an organic substance containing a phorbol ester and *Bacillus subtilis* var. *natto* and subjecting the resulting mixture to fermentation, thereby to decompose the phorbol ester.

The high-protein organic substance of the invention is characterized in that it comprises a fermented product obtained by mixing an organic substance containing a phorbol ester and *Bacillus subtilis* var. *natto* and subjecting the resulting mixture to fermentation, thereby to decompose the phorbol ester.

The method for producing a feed of the invention is characterized by mixing an organic substance containing a phorbol ester with *Bacillus subtilis* var. *natto*, and subjecting the resulting mixture to fermentation, thereby to decompose the phorbol ester.

The feed of the invention is characterized in that it comprises a fermented product obtained by a process in which an organic substance containing a phorbol ester component is mixed with *Bacillus subtilis* var. *natto*, thereby to decompose the phorbol ester.

Advantageous Effects of the Invention

According to the invention, a phorbol ester can be decomposed and removed from an organic substance containing a carcinogenic phorbol ester without using an expensive volatile reagent or generating a waste liquid containing a toxic substance which is difficult to be treated, and without using an expensive control device or a control apparatus. In addition, by allowing the above-mentioned phorbol ester-containing organic substance to be fermented at relatively mild conditions by using *Bacillus subtilis* var. *natto* which is relatively inexpensive and readily available, the phorbol ester can be decomposed and removed efficiently as compared with a case where other microorganism are used. As a result, a high removal ratio of a phorbol ester can be realized while keeping the initial cost and the running cost associated with the treatment to low. Accordingly, the invention exhibits advantageous effects that a method for removing a phorbol ester having a higher degree of treatment capability as compared with conventional methods, a high-protein organic substance, a feed or the like can be provided on the market at a lower cost.

BRIEF DESCRIPTION OF THE DRAWINGS

FIG. 5 is a schematic view showing the process of the second embodiment of the method for removing a phorbol ester according to the invention;

FIG. 11 is a schematic view showing the process (1) of the sixth embodiment of the method for producing a high-protein organic substance according to the invention;

FIG. 12 is a schematic view showing the process (2) of the sixth embodiment of the method for producing a high-protein organic substance according to the invention;

FIG. 14 is a schematic view showing the process of the seventh embodiment of the method for producing a high-protein organic substance according to the invention;

FIG. 15 is a view showing the results of a heavy metal analysis of the fermented *Jatropha curcas* (L.) *Jatropha curcas* (L.) obtained in Example 1 relating to the method for producing a high-protein organic substance according to the invention;

FIG. 16 is a view showing the weight of chickens which were bred by the feed prepared in Example 1, a feed prepared in Comparative Examples 1 and 2 and a feed of the control section relating to the method for producing a high-protein organic substance according to the invention;

FIG. 17 is a view showing an increase in weight in chickens which were bred by a feed prepared in Example 1, a feed prepared in Comparative Examples 1 and 2 a feed of the control section relating to the method for producing a high-protein organic substance according to the invention;

FIG. 18 is a view showing the feed intake of chickens which were bred by a feed prepared in Example 1, a feed prepared in Comparative Examples 1 and 2 and a feed of the control section relating to the method for producing a high-protein organic substance according to the invention; and FIG. 19 is a view showing the results of breeding of chickens which were bred by a feed prepared in Example 1, a feed prepared in Comparative Examples 1 and 2 and a feed of the control section relating to the method for producing a high-protein organic substance according to the invention.

BEST MODE FOR CARRYING OUT THE INVENTION

The invention will be explained in detail with reference to the drawings.

First Embodiment

Figure 1:
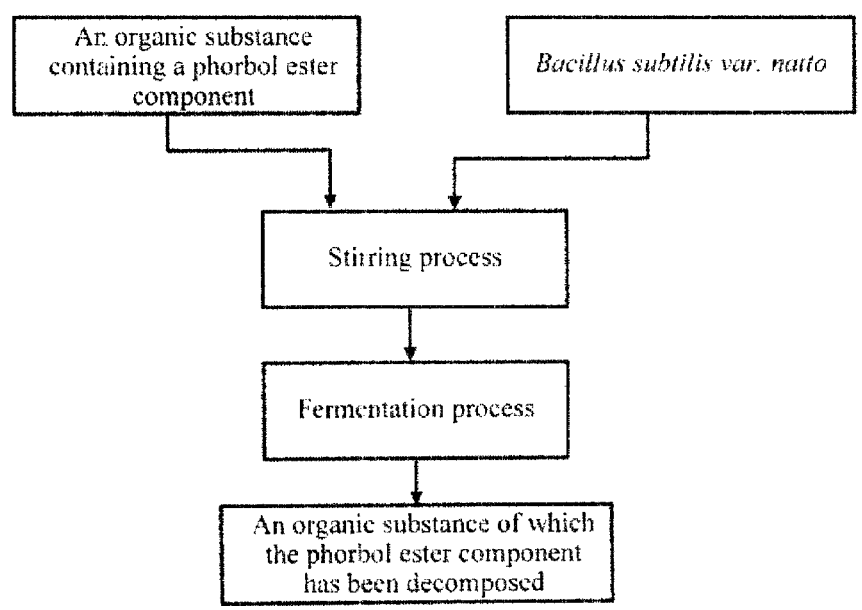
FIG. 1 is a schematic view showing the process of the first embodiment of the method for removing a phorbol ester according to the invention.

FIG. 1 is a schematic view showing the process of the first embodiment of the method for removing a phorbol ester according to the invention. In FIG. 1, an organic substance to be treated, which contains a phorbol ester component, is sufficiently stirred with *Bacillus subtilis* var. *natto* in the stirring process until a uniform distribution is attained. Thereafter, the thus stirred mixture is transferred to the subsequent fermentation process, and is kept in a fermentation room or a fermentation apparatus of which the temperature is controlled for a prescribed period of time. After the completion of the fermentation process, the phorbol ester in the treated mixture which has been taken out of the fermentation room or the fermentation apparatus is decomposed due to the action *Bacillus subtilis* var. *natto*. In addition, the mixture has an increased amount of vitamins or minerals due to the secondary action of *Bacillus subtilis* var. *natto*.

Figure 2:
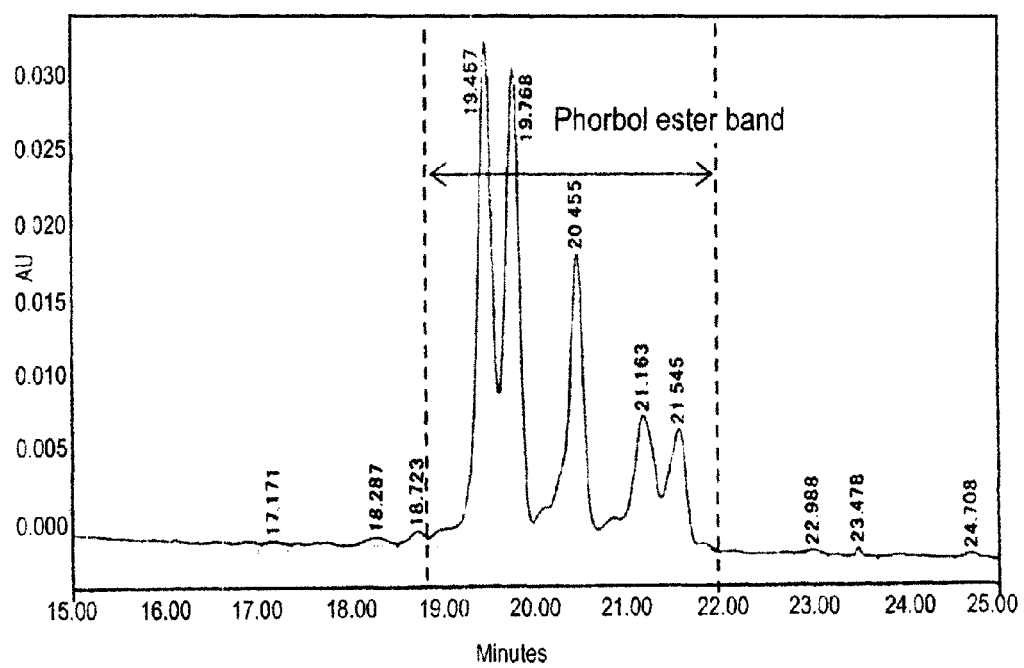
FIG. 2 is a view showing the measurement results of the phorbol ester content of an organic substance before the method for removing a phorbol ester according to the invention is applied.
Figure 3:
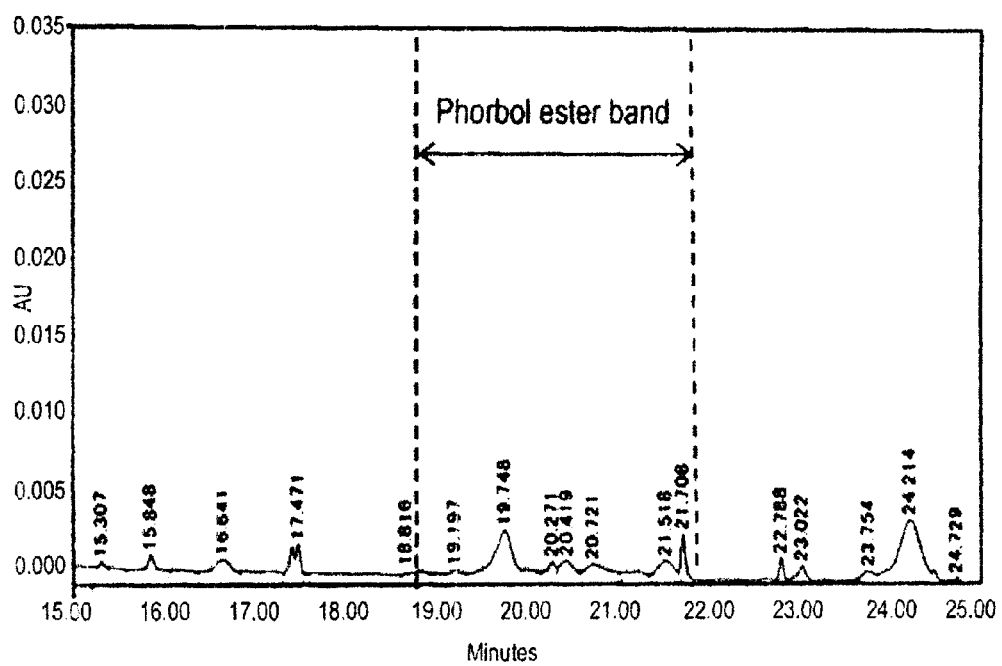
FIG. 3 is a view showing the measurement results of the phorbol ester content of an organic substance after the method for removing a phorbol ester according to the invention is applied.

Then, the superiority of the decomposition action of a phorbol ester in an organic substance by *Bacillus subtilis* var. *natto* will be explained with reference of the drawings. FIG. 2 is a view showing the measurement results of the phorbol ester content of an organic substance before the method for removing a phorbol ester according to the invention is applied, and FIG. 3 is a view showing the measurement results of the phorbol ester content of an organic substance after the method for removing a phorbol ester according to the invention is applied. Both FIG. 1 and FIG. 2 show the output results of an analysis utilizing a high-speed liquid chromatography (HPLC).

The phorbol ester content of an organic substance can be obtained by the following method. At first, after the analysis output results of HPLC as shown in FIGS. 2 and 3 are obtained, as for a range shown as a phorbol ester band in the figures, the area of the lower part of the measurement result curve (taken as A) is calculated by integration. After the analysis output results of HPLC using PMA (phorbol-12-myristate 13-acetate), which is a standard material of a phorbol ester, the area of the lower part of the measurement result curve (taken as B) is obtained in advance, as mentioned above, the phorbol ester amount in an organic substance is calculated by the area ratio A/B.

As compared FIG. 2 to FIG. 3, which show the measurement results of the phorbol ester content in an organic substance as mentioned above, it is understood that the area of the lower part of the measurement result curve of the phorbol ester band, that is, the phorbol ester content in an organic substance, is significantly reduced by conducting a fermentation treatment by *Bacillus subtilis* var. *natto*.

Figure 4:
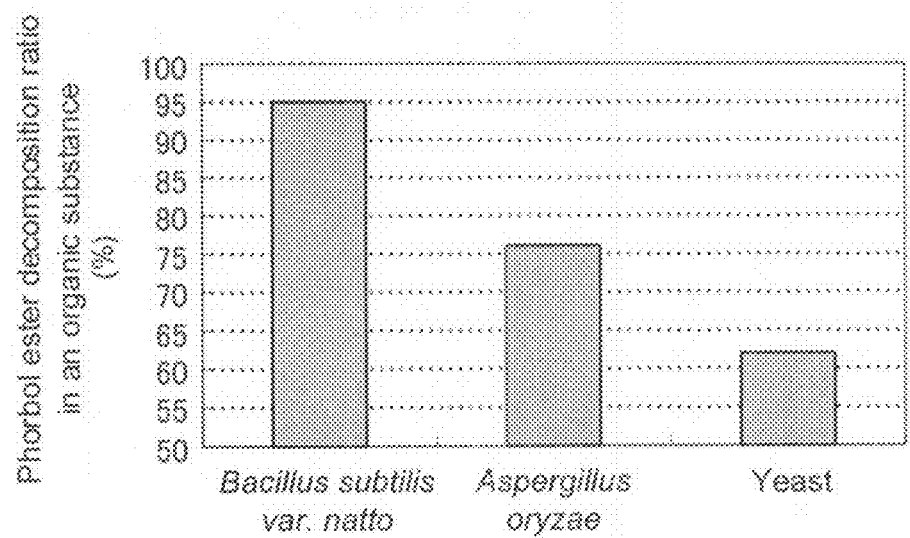
FIG. 4 is a view showing the results of comparative measurements of the phorbol ester decomposition ratio in an organic substance for each microorganism.

FIG. 4 is a view showing the results of comparative measurements of the ratio of decomposing a phorbol ester in an organic substance for each microorganism. The experimental conditions were as follows. A microorganism in an amount accounting for about 1% of the weight of an organic substance containing a phorbol ester component was mixed with the organic substance. The fermentation was conducted for three weeks at the optimum culture temperature for each microorganism (37° C. for *Bacillus subtilis* var. *natto* and yeast, and 30° C. for *Aspergillus oryzae*). The percentage of the decomposed phorbol ester which had been contained in the untreated organic substance was evaluated by an HPLC analysis and compared for each microorganism. FIG. 4 shows that *Bacillus subtilis* var. *natto*. has the most excellent decomposition power.

In the process of the above-mentioned first embodiment, a carcinogenic phorbol ester component can be removed from an organic substance containing a phorbol ester component at a high decomposition removal ratio and at a low cost by using *Bacillus subtilis* var. *natto*, which is a microorganism easily available, and by using a simple facilities consisting only of equipment for stirring and fermentation processes. In addition, due to the secondary action of *Bacillus subtilis* var. *natto*, it is possible to increase the amount of components such as vitamins and minerals in the treated organic substance. In particular, if the organic substance after the treatment is used in a raw material for a feed for animals, an additional advantageous effect is brought about that the feed is more nutrient.

Second Embodiment

FIG. 5 is a schematic view showing the process of the second embodiment of the method for removing a phorbol ester according to the invention. In FIG. 5, first, a phorbol ester-containing organic substance to be treated (the weight thereof is taken as A kg) is sent to a mixing process together with water of which the weight is A/2 kg. In the mixing process, the organic substance and water are mixed until a certain extent of uniformity is attained. Thereafter, the mixture is sterilized in the high-temperature and high-pressure sterilization process. Then, the sterilized mixture and 1% of *Bacillus subtilis* var. *natto* of which the weight is about A kg are dissolved in an A kg of sterilized water. The resultant is stirred in the stirring process until uniformity is attained, and is then sent to a fermentation process, where the resultant is allowed to stand in a sealed fermentation apparatus of which the temperature is controlled to 37 to 50° C. for about two to four weeks. After the completion of the fermentation process, in the treated mixture which is taken out of the fermentation apparatus, the phorbol ester component is decomposed by the action of *Bacillus subtilis* var. *natto*.

Figure 6:
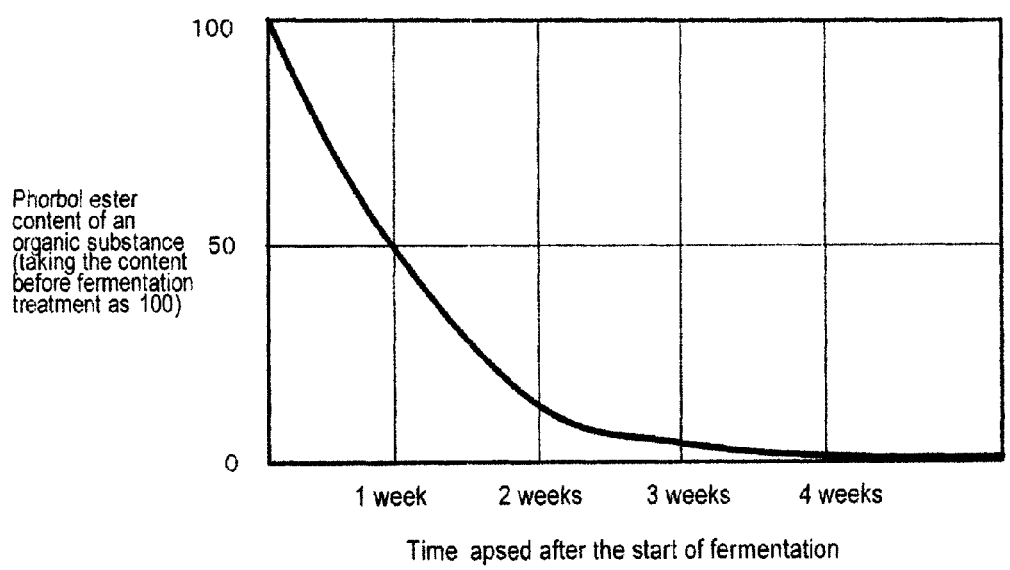
FIG. 6 is a view showing the results of examining how the phorbol ester content in an organic substance varies with time by the action of *Bacillus subtilis* var. *natto* during the fermentation process.

Then, as for the decomposition by *Bacillus subtilis* var. *natto* of the phorbol ester in an organic substance, the reason for setting the fermentation period to two to four weeks as mentioned above will be explained with reference to the drawings. FIG. 6 is a view showing the results of examining how the phorbol ester content in an organic substance varies with time by the action of *Bacillus subtilis* var. *natto* in the fermentation process. FIG. 6 reveals that, while the decomposition ratio after the lapse of one week after the start of the fermentation is about 50%, it increased to about 80% or more after the lapse of two weeks, to about 95% after the lapse of three weeks and about 99% after the lapse of four weeks. The phorbol ester decomposition ratio is increased with an increase in fermentation time, as is apparent from the above. However, if the treatment time is prolonged, a higher cost is incurred to keep the state. Accordingly, a suitable fermentation time at which the decomposition ratio and the cost are well-balanced is required to be selected. As a result of the above-mentioned studies, it has been revealed that an appropriate fermentation period is two to four weeks.

Subsequently, in the process of the second embodiment, the reason for subjecting the whole organic mixture to sterilization before the stirring and fermentation processes will be explained. Normally, an organic substance to be treated, which is normally used, contains various types of microorganism. They contain some microorganisms which inhibit the decomposition of a phorbol ester component by *Bacillus subtilis* var. *natto*. The above-mentioned high-temperature and high-pressure sterilization process is set in order to kill these decomposition-inhibiting microorganisms.

In the above-mentioned process of the second embodiment, the period of time during which an organic substance to be treated by *Bacillus subtilis* var. *natto* can be optimized, and at the same time, the maximum phorbol ester decomposition effect can be attained with the least amount of *Bacillus subtilis* var. *natto* by removing a factor which inhibits the phorbol ester decomposition action of *Bacillus subtilis* var. *natto*. Therefore, the cost required for removing phorbol ester in an organic substance can be further suppressed.

Third Embodiment

Figure 7:
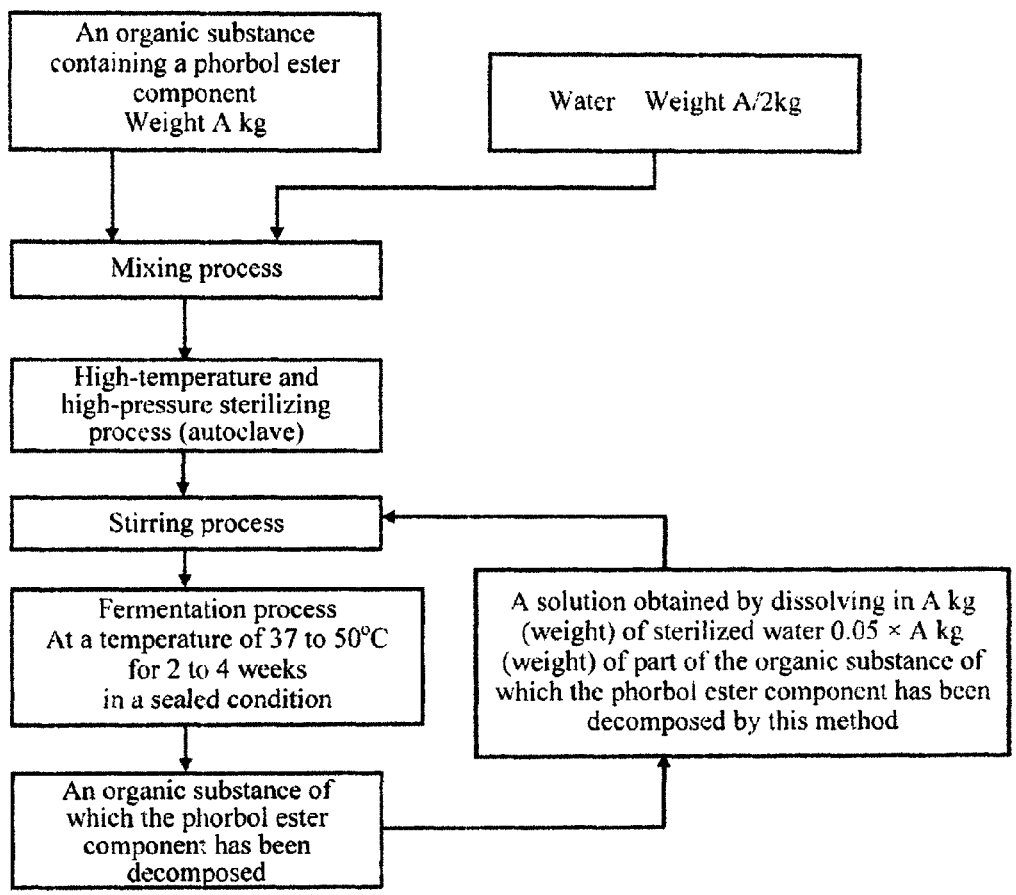
FIG. 7 is a schematic view showing the process for the third embodiment of the method for removing a phorbol ester according to the invention.

FIG. 7 is a schematic view showing the process for the third embodiment of the method for removing a phorbol ester according to the invention. In FIG. 7, first, a phorbol ester-containing an organic substance to be treated (the weight thereof is taken as A kg) is sent to a mixing process together with water of which the weight is about A/2 kg. In the mixing process, the organic substance and water are mixed until a certain extent of uniformity is attained. Thereafter, the mixture is sterilized in the high-temperature and high-pressure sterilization process. In this third embodiment, unlike the above-mentioned second embodiment, *Bacillus subtilis* var. *natto* itself is not used. This embodiment is characterized in that an organic substance of which the phorbol ester component has been decomposed in advance by the method for decomposing a phorbol ester according to the invention is used as a seed microorganism for fermentation. Then, the sterilized mixture and 5% of the above-mentioned phorbol ester-decomposed organic substance of which the weight is about A kg are dissolved in an A kg of sterilized water. The resultant is stirred in the stirring process until uniformity is attained, and is then sent to a fermentation process, where the resultant is allowed to stand in a sealed fermentation apparatus at a controlled temperature of 37 to 50° C. for about two to four weeks. After the completion of the fermentation process, in the treated mixture which is taken out of the fermentation apparatus, the phorbol ester component is decomposed by the action of *Bacillus subtilis* var. *natto*.

In the above-mentioned third embodiment, there is no need to prepare fresh *Bacillus subtilis* var. *natto* each time a phorbol ester in an organic substance is removed. As a result, the total amount of *Bacillus subtilis* var. *natto* can be further decreased as compared with the amount in the second embodiment. As a result, the cost required for the removal of a phorbol ester in an organic substance can be further suppressed.

Fourth Embodiment

Figure 8:
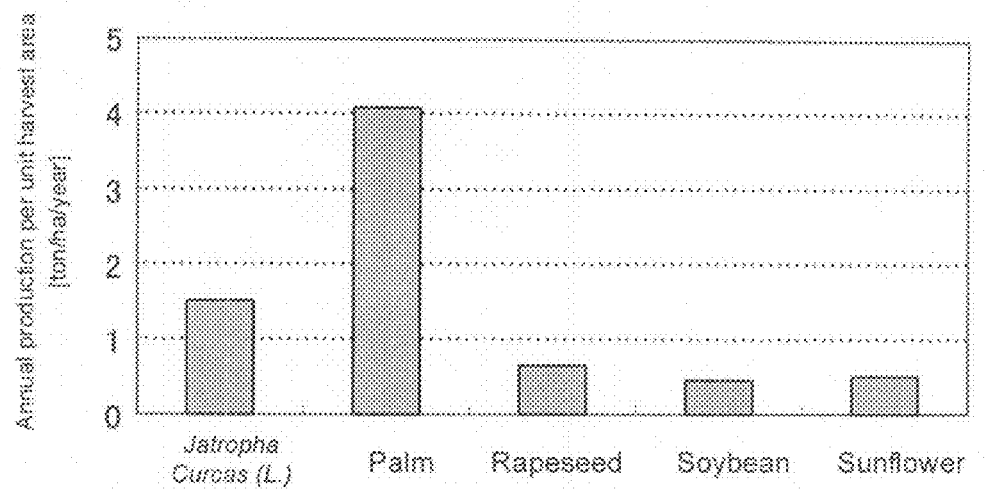
FIG. 8 is a view for explaining the productivity of oil of *Jatropha curcas* (L.) *Jatropha curcas* (L.) relating to the fourth embodiment of the method for removing a phorbol ester of the invention.
Figure 9:
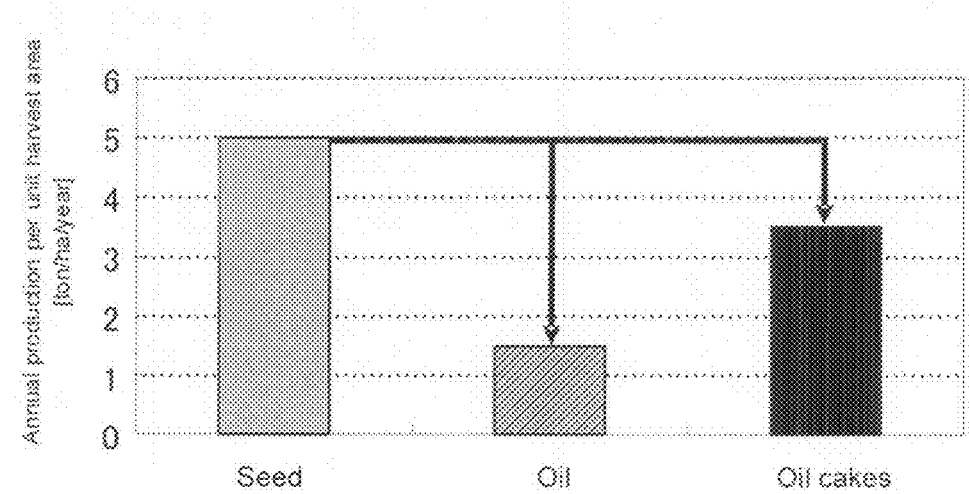
FIG. 9 is a view for explaining the generated amount of oil cakes of *Jatropha curcas* (L.) *Jatropha curcas* (L.) relating to the fourth embodiment of the method for removing a phorbol ester of the invention.

FIG. 8 is a view showing the productivity of oil of *Jatropha curcas* according to the fourth embodiment of the method for removing a phorbol ester of the invention. FIG. 9 is a view for explaining the generated amount of oil cakes of *Jatropha curcas*. L. This fourth embodiment is characterized in that, as an organic substance containing a phorbol ester component, oil cakes of seeds of *Jatropha curcas* (L.) of Euphorbiaceae are used.

Advantages of applying the method for removing phorbol ester according to the invention to oil cakes of seeds of *Jatropha curcas* (L.) will be explained with reference to FIGS. 8 and 9. FIG. 8 shows the results of the annual oil production per unit harvest area for representative oil cakes cultivated in every regions of the world. According to FIG. 8, the production amount of palm oil is significantly high. Oil production of *Jatropha curcas* (L.) is the second largest. However, the area where palm can be cultivated is limited to a relatively fertile tropical region where the amount of precipitation is large. In addition, since palm oil can be used as food, worldwide consensus for using it in a large amount as fuel or on the industrial basis cannot be easily obtained. Therefore, it has become difficult to expand the production of palm oil as a regenerative energy resource. Although *Jatropha curcas* (L.) boosts the second largest oil production to palm, the oil thereof cannot be used as food since it contains a carcinogenic phorbol ester. Therefore, oil of *Jatropha curcas* (L.) does not complete with palm oil for use as a food. In addition, *Jatropha curcas* (L.) can be cultivated not only in a tropical area with a large amount of precipitation where palm can cultivated but also in a dry area where the amount of precipitation is small and crops for food use do not grow. Accordingly, *Jatropha curcas* (L.) has attracted attention all over the world as a promising regenerative energy resource.

FIG. 9 shows the results of comparing the amount of seeds of *Jatropha curcas* (L.) produced per unit area of a cultivated field of *Jatropha curcas*. L, the amount of oil generated by subjecting the seeds to oil pressing and the amount of oil cakes. Not only FIG. 8 but also FIG. 9 show that *Jatropha curcas* (L.) is capable of producing oil in an amount of about 1.5 tons on the annual basis per unit harvest area. Simultaneously with the production of oil in such an amount, oil cakes are concomitantly produced after oil pressing in an amount of 3.5 tons on the annual basis per unit harvest area, which is twice or larger the oil production amount. The oil cakes which are generated in a large amount together with oil contain a carcinogenic phorbol ester component as in the case of oil. Therefore, it cannot be used as it is as a raw material as a feed for animals, and the application thereof is limited to a fertilizer with a low additional value or to a solid fuel with a low unit cost. Therefore, it was difficult to utilize effectively the whole regenerative resource obtained by harvesting *Jatropha curcas*. L.

As mentioned above, in the fourth embodiment in which oil cakes obtained by subjecting *Jatropha curcas* (L.) seeds to oil pressing are used as the organic substance containing a phorbol ester component, even when oil, which does not compete with food, is produced in a large amount by cultivating *Jatropha curcas*. L, a phorbol ester component in oil cakes which are generated as a side product in an amount larger than the amount of oil can be removed by decomposition. As a result, oil cakes from which a phorbol ester component has been removed can be put on the market as a raw material for a feed for animals with an increased value. As a result, profits of enterprises which undertake the cultivation of *Jatropha curcas* (L.) can be significantly increased, whereby inexpensive oil can be put on the market and regenerative biomass resources which are produced by the growth of *Jatropha curcas* (L.) as a plant can be utilized more effectively.

Fifth Embodiment

Figure 10:
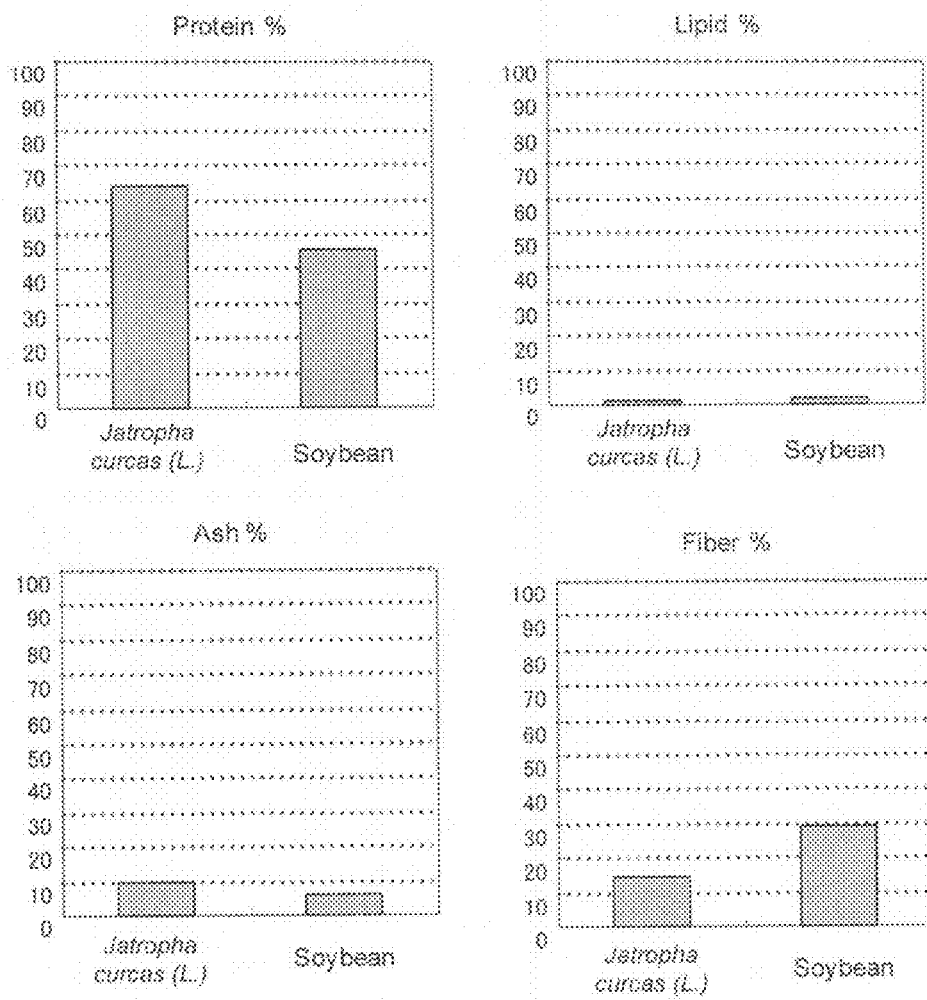
FIG. 10 is a view for explaining the superiority, as a raw material of a feed, of oil cakes of *Jatropha curcas* (L.) *Jatropha curcas* (L.) kernels relating to the fifth embodiment of the method for removing a phorbol ester according to the invention.

FIG. 10 is a view for explaining the superiority as a raw material of a feed of oil cakes of *Jatropha curcas* (L.) kernels relating to the fifth embodiment of the method for removing a phorbol ester according to the invention. This fifth embodiment is characterized in that, as an organic substance containing a phorbol ester component, use is made of oil cakes formed by a process in which seeds of *Jatropha curcas* (L.) of Euphorbiaceae are threshed to take the kernels thereof out, and the kernels are then subjected to oil pressing.

Referring to FIG. 10, an explanation is made on an advantage of applying the method for removing a phorbol ester according to the invention to the oil cake of *Jatropha curcas* (L.) kernels. FIG. 10 shows the results of comparing oil cakes of *Jatropha curcas* (L.) kernels with soybean oil cakes which are representative raw materials of a feed for the components which are important for use as a raw material of a feed. From this figure, it can be understood that, as for protein which is the most important component as a raw material of a feed, while soybean contains protein in an amount of about 45%, *Jatropha curcas* (L.) contains protein in an amount of 60% or more. Regarding the lipid content and the ash content, there is no big difference between *Jatropha curcas* (L.) and soybean. *Jatropha curcas* (L.) has a smaller fiber content than soybean. From the above results, it can be understood that, as long as a carcinogenic phorbol ester component can be removed, oil cakes of *Jatropha curcas* (L.) with a high protein content and a low fiber content can be a raw material of a feed which is superior to soybean oil cakes.

As mentioned hereinabove, in the fifth embodiment in which, as an organic substance containing a phorbol ester component, use is made of oil cakes formed by a process in which seeds of *Jatropha curcas* (L.) are threshed to take the kernels thereof out, and the kernels are then subjected to oil pressing (Jatropha kernel oil cakes), by decomposing and removing a phorbol ester component, the concentration of nutrients as a raw material of a feed can be significantly improved as compared with the case of oil cakes generated by subjecting *Jatropha curcas* (L.) seeds themselves to oil pressing, and as a result, oil cakes can be used as a raw material of a feed which is superior to soybean oil cakes. Accordingly, it becomes possible to put on the market the oil cakes after the treatment as a feed for animals with the enhanced value. As a result, advantageous effects that the profitability of enterprises which undertake the cultivation of *Jatropha curcas* (L.) can be further improved, and the market price of Jatropha oil as a regenerative energy resource can be stabilized to a lower level can be expected.

Sixth Embodiment

Figure 13:
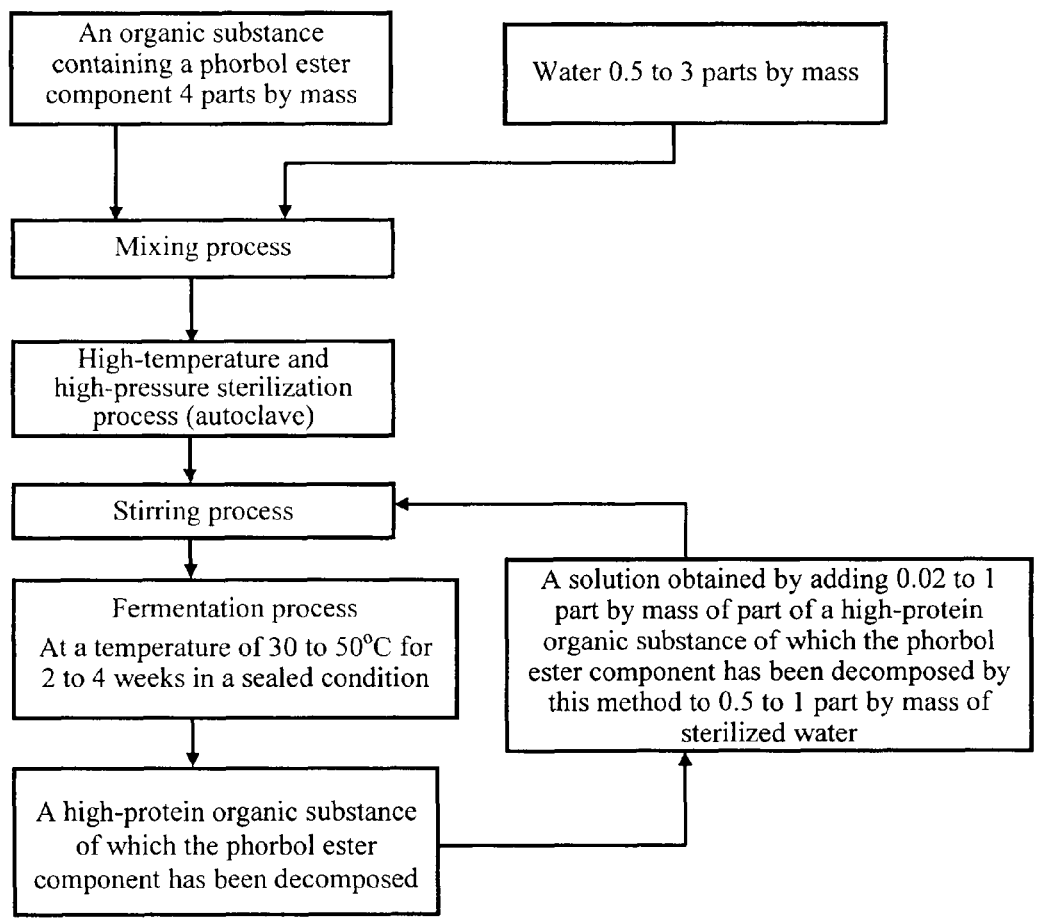
FIG. 13 is a schematic view showing the process (3) of the sixth embodiment of the method for producing a high-protein organic substance according to the invention.

Then, a method for producing a high-protein organic substance utilizing the method for removing a phorbol ester according to the first to fifth embodiments will be explained with reference to FIGS. 11 to 13. FIGS. 11 to 13 are each a schematic view showing the processes (1) to (3) of this embodiment.

As shown in FIG. 11, the method for producing a high-protein organic substance according to this embodiment is characterized in that, by mixing *Bacillus subtilis* var. natto with an organic substance containing a phorbol ester component, followed by stirring to allow the mixture to be subjected to fermentation, whereby a high-protein organic substance of which the phorbol ester component is decomposed is produced.

As the organic substance containing a phorbol ester component, use can be made of oil cakes of *Jatropha curcas* (L.) of Euphorbiaceae, or oil cakes formed by a process in which seeds of *Jatropha curcas* (L.) are threshed to take the kernels thereof out, and the kernels are then subjected to oil pressing.

Here, the high-protein organic substance means an organic substance with a high protein content. As shown in FIG. 10, for example, *Jatropha curcas* (L.) has a protein content which is further higher than that of soybean which has a high protein content. An organic substance obtained by decomposing a phorbol ester contained in *Jatropha curcas* (L.) has a high protein content. Specifically, an organic substance having a protein content of 40 to 65% or higher can be defined as a high-protein organic substance.

An organic substance of which the phorbol ester component is decomposed by mixing *Bacillus subtilis* var. *natto*, followed by fermentation, is not limited to *Jatropha curcas* (L.). The technical concept of this embodiment can be similarly applied to a high-protein organic substance containing a phorbol ester component, and a high-protein organic substance can be preferably produced by decomposing the phorbol ester component with *Bacillus subtilis* var. *natto*.

The method for producing a high-protein organic substance is not particularly limited insofar as it can produce a high-protein organic substance by mixing *Bacillus subtilis* var. *natto*, followed by stirring to allow the mixture to be fermented, as shown in FIG. 11. However, as shown in FIGS. 12 and 13, it comprises a mixing process (A1), a high-temperature and the high-pressure sterilization process (A2), a stirring process (A3) and a fermentation process (A4).

(A1) Mixing Process

At first, water is mixed in an organic substance containing a phorbol ester. As for the mixing ratio, it is preferred that 0.5 to 3 parts by mass of water be mixed with 4 parts by mass of an organic substance containing a phorbol ester. The reason therefor is that the efficiency of fermentation is improved by mixing water in such an amount ratio. Further, in this respect, it is more preferred that water be mixed in an amount of 2 to 3 parts by mass.

(A2) High-Temperature and High-Pressure Sterilization Process

Subsequently, a mixture liquid of an organic substance containing a phorbol ester and water is subjected to high-temperature and high-pressure sterilization. By this, microorganism which can inhibit fermentation by *Bacillus subtilis* var. *natto* is killed. This sterilization can be conducted by a common method in an autoclave.

(A3) Stirring Process

Then, as shown in FIG. 12, a solution obtained by adding *Bacillus subtilis* var. *natto* to sterilized water is added to the above-mentioned sterilized mixture liquid, followed by stirring. It is preferred that 0.004 to 0.2 part by mass of *Bacillus subtilis* var. *natto* be added relative to 0.5 to 1 part by mass of sterilized water. With such a mixing ratio of *Bacillus subtilis* var. *natto*, uniform fermentation can be realized. In this respect, it is more preferred that the mixing ratio of *Bacillus subtilis* var. *natto* be 0.04 to 0.12 part by mass.

Further, as an alternative for adding a solution obtained by adding *Bacillus subtilis* var. *natto* to sterilized water, as shown in FIG. 13, it is preferred that a high-protein organic substance obtained by the production method of this embodiment be added to sterilized water, and the resultant be added to the above-mentioned sterilized mixture liquid and stirred. This high-protein organic substance may be one which is produced by a method shown by any of FIGS. 11 to 13. By this method, it is not necessary to prepare *Bacillus subtilis* var. *natto* each time, resulting in a reduction in cost required for the production of a high-protein organic substance.

At this time, it is preferred that 0.02 to 1 part by mass of a high-protein organic substance be added relative to 0.5 to 1 part by mass of sterilized water. The reason therefor is that, by allowing the mixing ratio of a high-protein organic substance to be the above-mentioned ratio, a high fermentation efficiency can be realized at a low cost. In this respect, it is preferred that the mixing ratio of a high-protein organic substance be 0.2 to 0.4 part by mass.

(A4) Fermentation Process

Next, a mixture obtained by adding sterilized water containing *Bacillus subtilis* var. *natto* or sterilized water containing a high-protein organic substance, followed by stirring, is subjected to fermentation under sealed conditions.

In order to allow efficient fermentation, it is preferred that fermentation be conducted at 30 to 50° C., with 37 to 50° C. being more preferable. As for the fermentation time, as already mentioned in the second embodiment, it is preferred that fermentation be conducted for two to four weeks.

The thus obtained high-protein organic substance can be used as it is as a feed of a domestic animal such as chickens. Also, it is possible to use after adding to a conventional feed. The amount ratio of addition is not particularly restricted. However, as mentioned later in Examples, it is confirmed that chickens can be bred without particular problems even when a high-protein organic substance is added in an amount of 10 wt % to a feed.

According to the method for producing a high-protein organic substance according to this embodiment, it is possible to remove by decomposition, from an organic substance containing a phorbol ester component, a phorbol ester component at a low cost with a high degree of processing capability, whereby a high-protein organic substance which can be preferably used as a feed of domestic animals can be produced.

Seventh Embodiment

Next, the method for producing a high-protein organic substance according to the seventh embodiment will be explained with reference to FIG. 14.

As shown in FIG. 14, in the method for producing a high-protein organic substance in this embodiment, at first, *Bacillus subtilis* var. *natto* is mixed with an organic substance containing a phorbol ester component to conduct pre-culture. The thus-obtained pre-cultured product is added to and mixed in an organic substance containing a phorbol ester component to allow primary fermentation, whereby a high-protein organic substance of which the phorbol ester component has been decomposed is produced.

<Pre-Culture>

(B1) First Mixing Process

At first, water is mixed in an organic substance containing a phorbol ester. At this time, it is preferred that water be mixed in an amount of 0.5 to 1.5 part by mass relative to 2 parts by mass of an organic substance containing a phorbol ester component. The reason therefor is that, the efficiency of fermentation is increased by this water mixing ratio. In addition, in this respect, it is more preferred that water be mixed in an amount of 1 to 1.5 parts by mass.

(B2) First High-Temperature and High-Pressure Sterilization Process

Then, as in the case of the high-temperature and high-pressure sterilization process in the sixth embodiment, a mixed liquid of an organic substance containing a phorbol ester component and water is subjected to high-temperature and high-pressure sterilization.

(B3) First Stirring Process

Then, a solution obtained by adding *Bacillus subtilis* var. *natto* to sterilized water is added to the above-mentioned sterilized mixed liquid, followed by stirring. At this time, it is preferred that 0.002 to 0.1 part by mass of *Bacillus subtilis* var. *natto* be added relative to 0.5 part by mass of sterilized water. The reason therefor is that preferable fermentation can be realized with this mixing ratio. In this respect, it is more preferred that the mixing ratio of *Bacillus subtilis* var. *natto* be 0.02 to 0.06 part by mass.

(B4) Pre-Culture Process

Then, the mixed liquid obtained by the first stirring process is subjected to fermentation under sealed conditions. In order to conduct efficient fermentation, it is preferred that the fermentation be conducted at a temperature of 30 to 50° C., with 37 to 50° C. being more preferable. In addition, the fermentation period is preferably one to seven days.

<Primary Fermentation>
(B5) Second Mixing Process

Then, water is mixed with the organic substance containing a phorbol ester. At this time, it is preferred that 2 to 4 parts by mass of water be mixed relative to 5 parts by mass of the organic substance containing a phorbol ester. The reason therefor is that the efficiency of fermentation is increased with this mixing ratio. In this respect, it is more preferred that the mixing ratio of water be 3 to 4 parts by mass.

(B6) Second High-Temperature and High-Pressure Sterilization Process

Subsequently, as in the case of the first high-temperature and high-pressure sterilization process, a mixed liquid of the organic substance containing a phorbol ester and water is subjected to high-temperature and high-pressure sterilization.

(B7) Second Stirring Process

Next, a pre-cultured product obtained by the pre-culture is added to sterilized water. The sterilized water to which the pre-culture product has been added is then added to the mixed liquid which has been sterilized in the second high temperature and high-pressure sterilization process, followed by stirring.

At this time, it is preferred that 1 to 4 parts by mass of the pre-cultured product be added to 1 part by mass of sterilized water. With this mixing ratio of the pre-cultured product, a high fermentation efficiency can be realized at a low cost. In this respect, it is more preferred that the mixing ratio of the pre-cultured product be 2 to 4 parts by mass.

(B8) Primary Fermentation Process

Then, the mixed liquid obtained by adding water containing *Bacillus subtilis* var. *natto*, followed by stirring, is subjected to fermentation under sealed conditions. In order to conduct efficient fermentation, it is preferred that the fermentation be conducted at a temperature of 30 to 50° C., with 37 to 50° C. being more preferable. In addition, the fermentation period is preferably two to four weeks, as mentioned in the second embodiment.

As mentioned above, according to the method for producing a high-protein organic substance in this embodiment, fermentation activity can be promoted since *Bacillus subtilis* var. *natto* can be proliferated efficiently due to the pre-culture, and the resulting pre-cultured product can be subjected to primary fermentation by adding it to the organic substance containing a phorbol ester component.

As a result, the phorbol ester component in the organic substance can be decomposed more efficiently.

EXAMPLES

Hereinbelow, an explanation will be made on Examples and Comparative Examples of the method for producing a high-protein organic substance and a feed, as well as on the evaluation on usefulness of a high-protein organic substance and a feed obtained by this method.

Example 1

Prior to the processes for producing a high-protein organic substance and a feed, oil was extracted from *Jatropha curcas* (L.) to obtain residues of *Jatropha curcas*. L.

At first, 24 kg of seeds of *Jatropha curcas* (L.) was molted by means of a molting machine, whereby each seed was separated into a kernel and a seed coat. Only kernels were collected. The amount of the thus collected kernels was about 14.4 kg. Then, by means of a grinding machine, grinding was conducted such that the diameter of the kernel became about 2 mm.

Then, by means of an electric oil presser (Model: S100-200, manufactured by Sun Seiki Co., Ltd.), the kernels which had been ground were subjected to oil pressing, and oil is extracted. Kernels cakes which had been discharged from the oil presser (=residues of *Jatropha curcas*. L) were collected, and cooled naturally. The amount of the thus-collected residues of *Jatropha curcas* (L.) was about 7.2 kg.

Subsequently, the pre-culture and the primary fermentation were conducted by the following process, whereby a high-protein organic substance of which the phorbol ester component had been decomposed was obtained.

First, 1.5 L of water was added to 2 kg of the residues of *Jatropha curcas*. L, and the resultant was sterilized in an autoclave at 105° C. for 15 minutes. Subsequently, 0.5 L of sterilized water to which 15 ml of the fungus solution of *Bacillus subtilis* var. *natto* had been added was added, stirred sufficiently, and the resultant was pre-cultured for three days at 42° C.

Then, 4 L of water was added to 5 kg of the residues of *Jatropha curcas* (L.), and the resultant was sterilized in an autoclave at 105° C. for 15 minutes. Subsequently, 1 L of sterilized water to which 2 kg of a culture liquid obtained by the pre-culture (cultured product) had been added was added, followed by sufficient stirring. Then, primary fermentation was conducted for three weeks at 42° C. by stirring every five days. As the product of this fermentation, fermented *Jatropha curcas* (L.) as a high-protein organic substance of which the phorbol ester component had been decomposed was obtained.

Finally, this high-protein organic substance was added in an amount of 10 wt % of a test feed for chickens (standard feed SDB No. 1 for broilers on the first fatting stage, manufactured by Nippon Formula Feed Mfg Co., Ltd.), whereby a feed of this example was produced.

Comparative Example 1

*Jatropha curcas* (L.) of Comparative Example 1 was prepared by using the residues of *Jatropha curcas* (L.) of Example 1 as they were without being subjected to the decomposition treatment of the phorbol ester component.

Then, this *Jatropha curcas* (L.) was added to the same test feed for chickens as in Example 1 in an amount of 10 wt %, whereby a feed of this comparative example was obtained.

Comparative Example 2

Defatted soybean oil cakes (multi-purpose soybean meal for a feed manufactured by Nippon Formula Feed Mfg Co., Ltd.) was added in an amount of 10 wt % to the same test feed for chickens as in Example 1, whereby a feed of this comparative example was obtained.

(Evaluation)

<1. Acute Toxicity Test on Mouse (Oral $LD_{50}$)>

For the fermented *Jatropha curcas* (L.) obtained in Example 1, the acute toxicity test was conducted by the following method in the Tokyo Food Sanitation Association, Food Research Laboratory.

(1) Test Method (i) Preparation of a Dose Solution

Distilled water was added to the fermented *Jatropha curcas* (L.) obtained in Example 1 to prepare a 10% suspension. The thus-obtained suspension was used as the dose solution.

(ii) Animals Used and Dosage Method

Mice (10 male ddY mice) were starved for 4 hours before the administration, and the *Jatropha curcas* (L.) was forcibly administered once orally into the stomach by means of a probe.

(iii) Method and Period of Observation

The mice were observed for one week for mortality and abnormalities after the administration.

(2) Results of Observation

As a result, it was found that the rate of mortality after the administration of 2 g or more/kg (oral $LD_{50}$) was zero. After the administration, the weight of each mouse was increased satisfactorily, and no delayed toxicity was observed.

<2. Heavy Metal Analysis>

A heavy metal analysis test was conducted on the fermented *Jatropha curcas* (L.) obtained in Example 1 in the Japan Food Analysis Laboratories. According to the "Standards for Feed Analysis" (No. 1660, the seventh domestic animal B, dated Nov. 15, 1995), which are the standards for guidance on toxic substances in a feed, a feed containing heavy metals or the like in an amount exceeding the following standards cannot be put on the market.

(Standards) Arsenic 2.0 ppm, Lead 3.0 ppm, Cadmium 1.0 ppm, Mercury 0.4 ppm

The results of this test are shown in FIG. 15. As shown in FIG. 15, it was revealed that the fermented *Jatropha curcas* (L.) obtained in Example 1 did not contain heavy metals in an amount exceeding the above-mentioned guidance standard.

<3. Chick Growth Test>

Using the feed obtained in Example 1 and Comparative Examples 1 and 2, the growth test of chicks was conducted by the following method in the Shokukanken Inc. (Maebashi-shi, Arakuchi-machi 561-21, Gunma Prefecture).

(1) Test Method

Chicks 8 days after hatching were divided into groups each consists of seven chicks. These chicks were fed with the feeds obtained in Examples 1 and Comparative Examples 1 and 2. As control, the chicks were fed with a feed to which nothing was added (the same feed for chickens as in Example 1, except that no high-protein organic substance was added). The chicks were bred for 21 days after the hatching. Each chick was incessantly fed until the completion of the test, and was allowed free access to the drinking water. The average weight per chick, the weight gain per chick, the average feed intake and the health condition of each group during the test period were compared.

The chicks used in the test were 28 non-vaccinated female chicks which had had been hatched from eggs derived from broiler chickens bred in Kabushiki Kaisha Matsumoto Keien (Brand: Chunky). These chicks were subjected to preliminary breeding for 7 days in an experimental poultry house in Shokkanken Inc.

The results are shown in FIGS. 16 to 19. FIGS. 16 to 19 each show the weight, the weight gain, the feed intake and the breeding results of chickens bred by the feed in Example 1, Comparative Examples 1 and 2 relating to the method for producing a high-protein organic substance of the invention and the control feed.

From FIG. 16 and FIG. 17, it could be understood that the chicks of the chickens bred by the feed to which the fermented *Jatropha curcas* (L.) of Example 1 was added satisfactorily grew being by no means inferior to the chicks of the chickens bred by the feed to which the defatted soybean oil cake of Comparative Example 2 was added and the chicks of the chickens bred by the feed to which nothing was added.

As for the chicks which had been bred by a feed of Comparative Example 1 to which *Jatropha curcas* (L.) which had not been subjected to a phorbol ester decomposition treatment, it was observed that all chicks started suffering from loss of appetite and vital power 5 days after the start of the test. On the seventh day after the start of the test, these chicks had the smallest average weight of all experimental plots, and all of them died until 21 days had passed. Each of these chicks was subjected to autopsia to conduct a pathological examination. As a result, a jerry-like effusion was observed under the skin as well as in the abdomen, and dot-like hemorrhages were observed in the liver. The affected area was examined for fungi. As a result, Clostridium was separated. From the fact, it is considered that the death was caused by this fungus and not by the phorbol ester component.

Regarding the feed intake, as shown in FIG. 18, the intake of the fermented *Jatropha curcas* (L.) of Example 1 was slightly smaller than the intake of the defatted soybean oil cakes of Comparative Example 2 and that of the feed of the control section to which nothing was added. However, as shown in FIG. 19, the health condition of the chicks bred by the feed of Example 1 was similarly good as the health condition of the chicks bred by the feed of Comparative Example 2 and the feed of the control section. The chicks bred by the feed of Example 1 attained the largest weight gain relative to the feed intake.

The above results can be summarized as follows.

Weight Gain

Feed to which defatted soybean oil cakes were added >Feed to which fermented *Jatropha curcas* (L.) was added≈Feed to which nothing was added Feed Intake Feed to which defatted soybean oil cakes were added≈Feed to which nothing was added >Feed to which fermented *Jatropha curcas* (L.) was added Weight Gain Relative to Feed Intake Feed to which fermented *Jatropha curcas* (L.) was added >Feed to which defatted soybean oil cakes were added >Feed to which nothing was added As is apparent from the above, it has been revealed that the fermented *Jatropha curcas* (L.) of Example 1 can be used preferably as a feed.

Regarding the fermented *Jatropha curcas* (L.) of Example 1, there is a possibility that, by making arrangements (for example, giving flavor) to stimulate the appetite of chicks, the feed intake can be further increased, whereby the fermented *Jatropha curcas* (L.) can be utilized more effectively.

The invention is not limited to the above-mentioned embodiments and examples, and it is needless to say various modifications are possible within the scope of the invention.

For example, although *Jatropha curcas* (L.) was used in the above-mentioned examples, the invention can be applied other organic substances containing a phorbol ester component. In addition, the above-mentioned evaluation was made on the chicks. However, it is possible to use a high-protein organic substance produced by the invention can be used as a feed for other domestic animals such as swine, cattle and horses.

INDUSTRIAL APPLICABILITY

The invention can be preferably used to produce a feed for domestic animals such as chickens.

The invention claimed is:

1. A method for removing a phorbol ester component which comprises mixing an organic substance comprising a phorbol ester component and *Bacillus substilis* var. *natto* and subjecting the resulting mixture to fermentation, thereby to allow the phorbol ester component to be decomposed by said microorganism.

2. The method for removing a phorbol ester component according to claim 1, which further comprises, when the weight of the organic substance comprising a phorbol ester component is taken as A kg, mixing the organic substance comprising a phorbol ester component with A/2 kg of water, subjecting the resulting mixture to high-temperature and high-pressure sterilization, adding with stirring a solution obtained by dissolving 1 wt. % of *Bacillus substilis* var. *natto* in A kg of sterilized water to the mixture which has been subjected to the high-temperature and high-pressure sterilization, followed by sufficient mixing, and subjecting the resulting mixture to fermentation at 37 to 50° C. for two to four weeks.

3. A method for removing a phorbol ester component which comprises, when the weight of the organic substance comprising a phorbol ester component is taken as A kg, mixing the organic substance comprising a phorbol ester component with A/2 kg of water, subjecting the resulting mixture to high-temperature and high-pressure sterilization,
adding with stirring a solution obtained by dissolving in A kg of sterilized water 5 wt. % of an organic mixture which has been treated in advance by the method for removing a phorbol ester according to claim 1 to the mixture which has been subjected to the high-temperature and high-pressure sterilization, followed by sufficient mixing, and subjecting the resulting mixture to fermentation at 37 to 50° C. for from two to four weeks.

4. The method for removing a phorbol ester component according to claim 1, wherein the organic substance comprising a phorbol ester component is an oil cake obtained by a process comprising subjecting seeds of *Jatropha curcas*. (L.) to oil pressing.

5. The method for removing a phorbol ester component according to claim 1, wherein the organic substance comprising a phorbol ester component is an oil cake obtained by a process in which seeds of *Jatropha curcas*. (L.) are threshed to take the kernels thereof out, and the kernels are then subjected to oil pressing.

6. A method for producing a high-protein organic substance which comprises mixing an organic substance comprising a phorbol ester component and *Bacillus substilis* var. *natto* and subjecting the resulting mixture to fermentation, thereby to decompose the phorbol ester component.

7. The method for producing a high-protein organic substance according to claim 6, which further comprises mixing 4 parts by mass of an organic substance comprising a phorbol ester with 0.5 to 3 parts by mass of water, subjecting the resulting mixture to high-temperature and high-pressure sterilization, adding a solution obtained by adding 0.004 to 0.2 parts by mass of *Bacillus substilis* var. *natto* to 0.5 to 1 parts by mass of water, and subjecting the resulting mixture to fermentation at 30 to 50° C. for from two to four weeks.

8. The method for producing a high-protein organic substance, which comprises mixing 4 parts by mass of an organic substance comprising a phorbol ester component and 0.5 to 3 parts by mass of water, subjecting the resulting mixture to high-temperature and high-pressure sterilization, adding a solution obtained by adding 0.02 to 1 parts by mass of a high-protein organic substance obtained by the method according to claim 6 to 0.5 to 1 parts by mass of water, and subjecting the resulting mixture to fermentation at 30 to 50° C. for from two to four weeks.

9. The method for producing a high-protein organic substance according to claim 6, which further comprises mixing an organic substance comprising a phorbol ester component and *Bacillus substilis* var. *natto* to allow the resulting mixture to pre-culture, mixing the organic substance comprising a phorbol ester component and *Bacillus substilis* var. *natto*, and adding the pre-cultured product to the resulting mixture, thereby to allow the phorbol ester component to be decomposed.

10. A method for producing a high-protein organic substance according to claim 9, which comprises mixing 2 parts by mass of an organic substance comprising a phorbol ester component and 0.5 to 1.5 parts by mass of water, subjecting the resulting mixture to high-temperature and high-pressure sterilization, adding a solution obtained by adding 0.002 to 0.1 parts by mass of *Bacillus substilis* var. *natto* to 0.5 parts by mass of water, and subjecting the resulting mixture to fermentation at 30 to 50° C. for from one to seven days,
mixing 5 parts by mass of an organic substance comprising a phorbol ester component with 2 to 4 parts by mass of water, subjecting the resulting mixture to high-temperature and high-pressure sterilization, adding a solution obtained by adding 1 to 4 parts by mass of a pre-cultured product obtained by pre-culture to 1 part by mass of water, and subjecting the resulting mixture to primary fermentation at 30 to 50° C. for from two to four weeks.

11. A method for producing a high-protein organic substance according to claim 6, wherein the organic substance comprising a phorbol ester component is an oil cake obtained by a process comprising subjecting seeds of *Jatropha curcas*. (L.) to oil pressing or an oil cake obtained by a process in which seeds of *Jatropha curcas*. (L.) are threshed to take the kernels thereof out, and the kernels are then subjected to oil pressing.

12. A high-protein organic substance which comprises a fermented product obtained by a process comprising mixing an organic substance comprising a phorbol ester component and *Bacillus substilis* var. *natto* and subjecting the resulting mixture to fermentation, thereby to decompose the phorbol ester component.

13. The high-protein organic substance according to claim 12, wherein the organic substance comprising a phorbol ester component is an oil cake obtained by a process comprising subjecting seeds of *Jatropha curcas*. (L.) to oil pressing or an oil cake obtained by a process in which seeds of *Jatropha curcas*. (L.) are threshed to take the kernels thereof out, and the kernels are then subjected to oil pressing.

14. A method for producing a feed comprising mixing an organic substance comprising a phorbol ester component with *Bacillus substilis* var. *natto*, and subjecting the resulting mixture to fermentation, thereby to decompose the phorbol ester component.

15. The method for producing a feed according to claim 14, which further comprises mixing 4 parts by mass of an organic substance comprising a phorbol ester component with 0.5 to 3 parts by mass of water, subjecting the resulting mixture to high-temperature and high-pressure sterilization, adding a solution obtained by adding 0.004 to 0.2 parts by mass of *Bacillus substilis* var. *natto* to 0.5 to 1 parts by mass of water, and subjecting the resulting mixture to fermentation at 30 to 50° C. for from two to four weeks.

16. A method for producing a feed which comprises mixing 4 parts by mass of an organic substance comprising a phorbol ester component and 0.5 to 3 parts by mass of water, subjecting the resulting mixture to high-temperature and high-pressure sterilization, adding a solution obtained by adding 0.02 to 1 parts by mass of the feed obtained by the method according to claim 14 to 0.5 to 1 parts by mass of water and subjecting the resulting mixture to fermentation at 30 to 50° C. for from two to four weeks.

17. The method for producing a feed according to claim 14, comprising mixing an organic substance comprising a phorbol ester component with *Bacillus substilis* var. *natto* and subjecting the resulting mixture to pre-culture, and subsequently mixing an organic substance comprising a phorbol ester component with *Bacillus substilis* var. *natto*, adding the pre-cultured product to the resulting mixture to subject the mixture to primary fermentation, thereby to decompose the phorbol ester component.

18. The method for producing a feed according to claim 17, which comprises mixing 2 parts by mass of an organic substance comprising a phorbol ester component and 0.5 to 1.5 parts by mass of water, subjecting the resulting mixture to high-temperature and high-pressure sterilization, adding a solution obtained by adding 0.002 to 0.1 parts by mass of *Bacillus substilis* var. *natto* to 0.5 parts by mass of water, and subjecting the resulting mixture to fermentation at 30 to 50° C. for from one to seven days, mixing 5 parts by mass of an organic substance comprising a phorbol ester component with 2 to 4 parts by mass of water, subjecting the resulting mixture to high-temperature and high-pressure sterilization, and adding a solution obtained by adding 1 to 4 parts by mass of a pre-cultured product obtained by pre-culture to 1 part by mass of water, and subjecting the resulting mixture to primary fermentation at 30 to 50° C. for two to four weeks.

19. The method for producing a feed according to claim 14, wherein the organic substance comprising a phorbol ester component is an oil cake obtained by a process comprising subjecting seeds of *Jatropha curcas*. (L.) to oil pressing or an oil cake obtained by a process in which seeds of *Jatropha curcas*. (L.) are threshed to take the kernels thereof out, and the kernels are then subjected to oil pressing.

20. A feed which comprises a fermented product obtained by mixing an organic substance comprising a phorbol ester component and *Bacillus substilis* var. *natto* and subjecting the resulting mixture to fermentation, thereby to decompose the phorbol ester component.

21. The feed according to claim 20 wherein the organic substance comprising a phorbol ester component. is an oil cake obtained by a process comprising subjecting seeds of *Jatropha curcas*. (L.) to oil pressing or an oil cake obtained by a process in which seeds of *Jatropha curcas*. (L.) are threshed to take the kernels thereof out.

* * * * *